Jan. 22, 1963    J. G. ALEXANDER ETAL    3,074,802
MOLDING COMPOSITION AND METHOD
Filed May 11, 1959    2 Sheets-Sheet 1
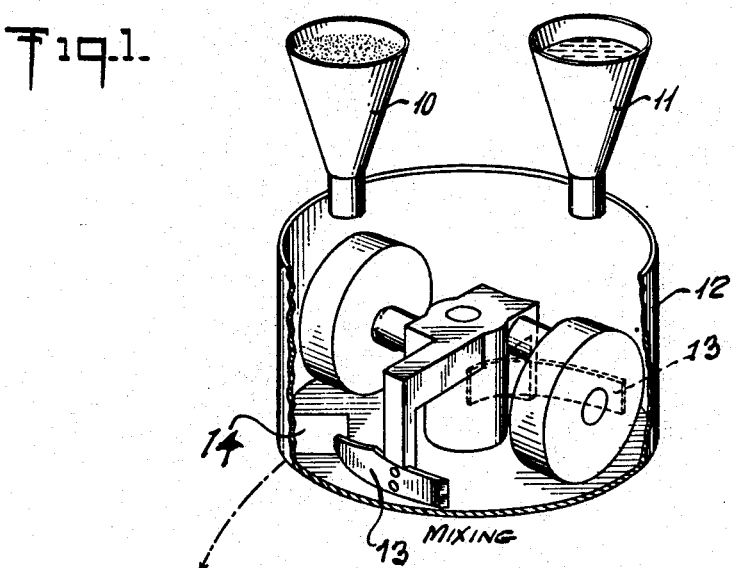
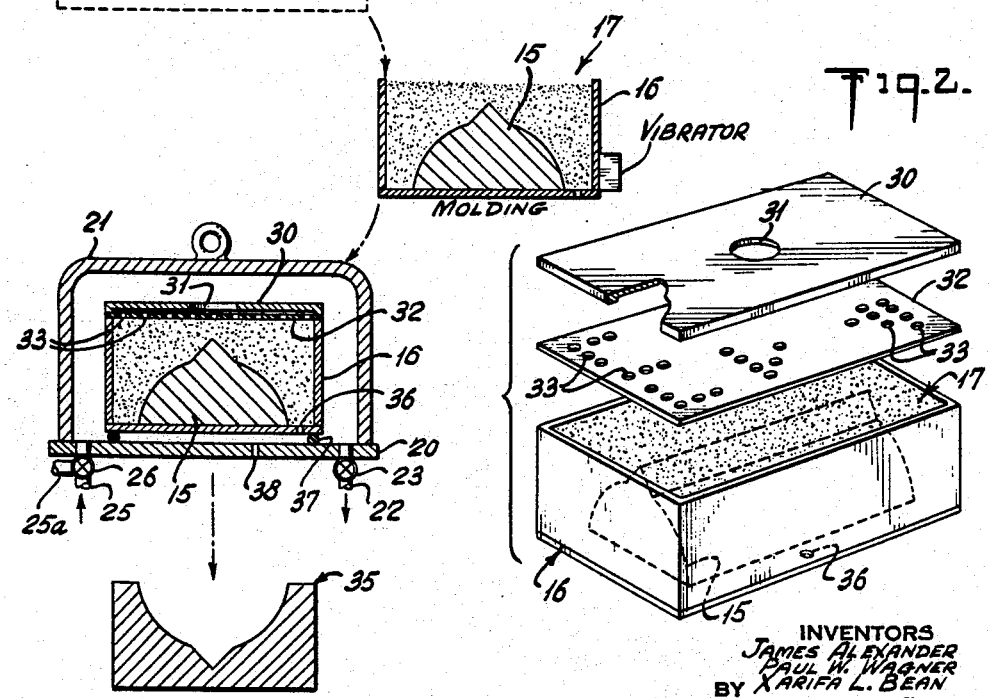
INVENTORS
JAMES ALEXANDER
PAUL W. WAGNER
XARIFA L. BEAN
BY Curtis, Morris & Safford
ATTORNEYS Jan. 22, 1963   J. G. ALEXANDER ETAL   3,074,802
MOLDING COMPOSITION AND METHOD
Filed May 11, 1959   2 Sheets-Sheet 2
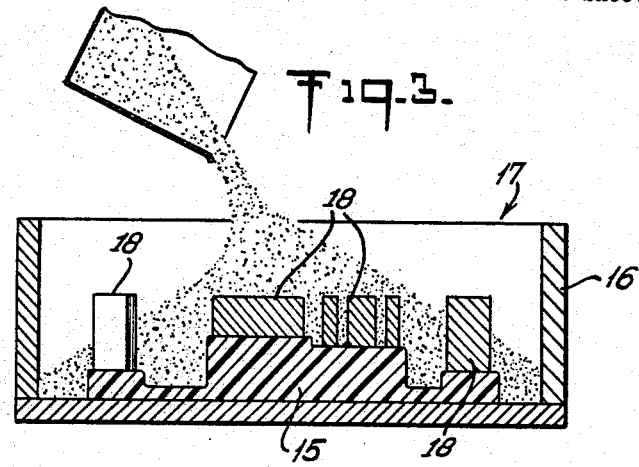
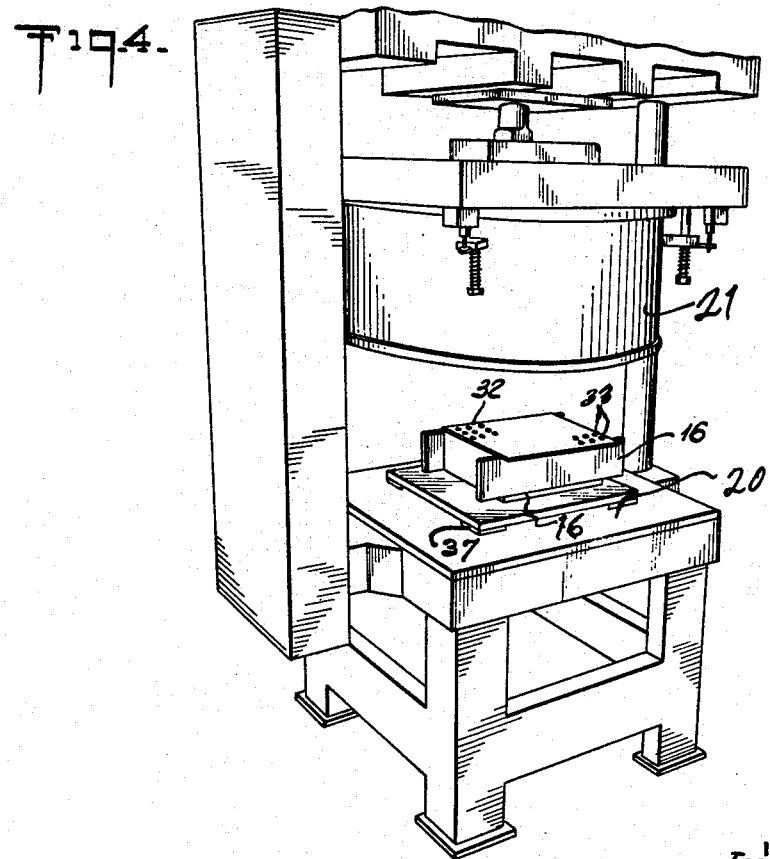
INVENTORS
JAMES ALEXANDER
PAUL W. WAGNER
BY KARIFA L. BEAN
Curtis, Morris & Safford
ATTORNEYS 3,074,802
MOLDING COMPOSITION AND METHOD
James G. Alexander, Paul W. Wagner, and Xarifa L. Bean, Yellow Springs, Ohio, assignors to Morris Bean & Company, Yellow Springs, Ohio
Filed May 11, 1959, Ser. No. 812,324
34 Claims. (Cl. 106—38.3)

This invention relates to a molding composition and method in the foundry art and, more particularly, to mold making materials and processes involving granular materials which are essentially dry, free flowing and pourable, but have the grains thereof coated with a binder adapted to form a firm bond.

The foundry operations of the character to which this invention relates involve the forming of molds from refractory granular materials (most frequently sand) for casting of molten metal to form metal castings. Generally such molds have been initially formed by packing granular materials, such as sand, on a pattern, and somehow causing the grains of sand or other molding material to be held together into a self-sustaining mold body which, after removal of the pattern therefrom, will serve for casting molten metal therein and will reproduce on such castings tne shape and surface configurations of the pattern.

It is well understood in this art that certain characteristics which may be desired in a molding composition or in the finished mold may be mutually inconsistent in any particular molding composition; and known molding compositions and methods leave much to be desired.

Among the qualities which we have hoped to combine in a molding composition are the ability to quickly and easily conform to the contour and surface character of a pattern and to accurately reproduce them in a casting. The mold material, as used for casting, should be permeable for the escape of gases from the mold cavity.

Particularly in production foundry techniques where a number of identical castings are to be mass produced from one or a few expensive patterns, it may be desired that self-sustaining molds be obtained and removed as rapidly as possible from each pattern. It may also be desired, particularly where the casting to be made has substantial undercuts therein and a flexible pattern is used, to bond the mold material without baking the mold on the pattern.

Initial fluidity could be attained by utilizing a liquid slurry molding composition, but costly time difficulty is experienced in eliminating the liquid. Ordinarily, this would require a high temperature baking step for final drying. Moreover, the finished mold so produced, however accurately it may have reproduced the surface contours of the pattern, may be distorted by shrinkage during drying. On the other hand, a material which is sticky enough for quick molding and removal from the pattern (e.g., a damp sand having a high clay-content and sufficient water to activate the clay binder) will not conform fluently to the precise surface contours, configurations and texture of the pattern. In a copending application, we have disclosed dry coated grains with a coat of thermosetting resin; the desired bonding being developed by subjecting thermosetting resin to heating while on the pattern. This ties up the pattern for a substantial period of time before it can be used again or requires wastable patterns. We have sought, moreover, to avoid or minimize dimensional change while cementing the grains together.

According to this invention, molding compositions and methods are provided which utilize dry granular mold materials, such as sand, which are pourable for forming a faithful reproduction of a pattern surface. The grains of these materials are most advantageously coated with a binder material which, although it leaves them "dry" (substantially free from adherence and from tendency to plastic flow), can be quickly bonded and set. This can be done, according to the present invention, by subjecting the external surface of a dry, potential binder to a dry activating gas. A bond is thus formed at spaced points of contact among the coated grains giving a cohesive mold of desired permeability for the casting operation.

By this invention, we provide a process of the character described for production of foundry casting molds (which term is also to be understood herein as including cores and the like) utilizing refractory grains carrying dry binder material, and moving the grains with respect to one another in free flow under influence of their own mass into a faithful reproduction of a pattern surface, and then treating the binder by an activating gas to form a firm bond among the grains, and thus forming a finished mold of desired cohesive strength and gas-permeability well adapted for use in casting. ("Activating" and "activatable" here are used in their obvious meaning that the presence of water or a gas activates the coating to cause it to serve as a binder, even though further reaction, as with the $CO_2$ or released water, etc., may be necessary to get full strength in the bond.)

By this invention, we also provide a molding composition of the character described comprising a granular material, the individual grains of which are coated with an activatable binder material of such a character as to leave the coated granular material initially pourable, but activatable to adhere with like contacting grains and to set into a firm bond, whereby to convert the granular material into a self-sustaining mold, by reaction with a gas.

By our invention, we also provide apparatus for initially applying such activatable bonding material to the granular material, for holding the resulting granular material on the surface of the pattern, and for supplying and directing activating gases into, and for evacuating various gases from, the granular material for setting the binder to give a self-sustaining mold.

By our invention also we provide a mold for metal casting of the character described, formed with controlled density and permeability and controlled cohesive strength, the grains being bonded together only at spaced points of contact, leaving substantial interstices for gas permeability.

Other objects and advantages of this invention will be apparent from the following description, the accompanying drawing, and the appended claims.

In the drawing:

FIG. 1 is a schematic or diagrammatic flow sheet indicating or illustrating the various process steps and apparatus embodying and for practicing this invention; and FIG. 2 is a perspective view in exploded form indicating a device embodying, and for practicing, this invention, for containing the molding composition during the application thereof to a pattern and for the activation or setting of the binder therein.

FIGURE 3 is a vertical cross-sectional view of a mold flask and pattern with chills thereon partially filled with the granular molding composition.

FIGURE 4 is a showing of the apparatus for accomplishing this invention and in somewhat more detail than the schematic or diagrammatic showing of the evacuating step in FIGURE 1.

Referring to the drawing, various operations embodying and for practicing one example of this invention are indicated in FIGURE 1. Thus, a satisfactory molding composition is initially prepared by admixing a granular refractory material with an activatable dry binder coat on the individual grains. The granular material, e.g., sand, is drawn from a supply 10. The binder material is drawn from a supply 11. This mixing can be done effectively in a muller 12 or such mixing apparatus as will intimately admix the binder material with the granular material, advantageously coating the individual grains with a liquid binder material, drying coatings and breaking up agglomerates during the drying. A stream of dry air or nitrogen may be blown from a duct 14 onto the granular material as it is turned by the "plow" 13 of the muller; but if the muller is one which keeps agitating air into the sand as is the case with the "Speed Muller" sold by Beardsley and Piper, for example, drying will ordinarily be sufficient without special provision for an air stream.

After mixing and drying are complete, the dry molding composition may be stored prior to use, but if the binder is hygroscopic should be protected from moisture. In some cases, further mixing and/or drying just before use is advantageous, and with some materials improved results may be obtained by aging after mixing and before use. These steps are optional.

In any case, satisfactory molding compositions of this invention are, at the time of use, essentially free-flowing and pourable, and have substantially no measurable "green strength," i.e., they are composed of grains which are individually free to move on each other, their contacting surfaces being so dry that the mass, when poured onto a pattern, adjusts itself under the force of gravity to conform to the surface of a pattern. Vibrating or tapping the container may be used to collapse arching of the grains, if it occurs, and to shake down the material to increased density. The molding composition is substantially dry, i.e., having less than about 0.3%, and advantageously less than about 0.1% by weight, free liquid (not including bound water, such as water of hydration) and no "tacky" surface.

The initial formation of such molding composition into a mold according to this invention (as indicated at the legend "Molding" in FIG. 1) is accomplished by placing a conventional pattern 15 in a foundry flask or other container 16 and pouring the molding composition over the pattern to fill the flask 16, as indicated at 17. As suggested above, the flask 16 and its contents may be subjected to vibration, tapping or shaking for compacting the molding composition 17. Advantageously, the molding composition has such free flowability as faithfully to conform to and reproduce the surface of pattern 15 to fill all crevices, and to flow between each closely spaced chills 18, if used and to gain sufficient density in flask 16 without throwing, blowing, tamping, or pressing the granular material onto the pattern.

After the mass 17 of the molding composition is introduced into flask 16, the binder coating on the grains is subjected to a gas which activates it to form a firm bond producing a cohesive, self-sustaining mold which can be removed without damage from the pattern.

To this end, box 16 is placed on the floor 20 of a pressure chamber, here shown as a bell jar 21 on a platen 20.

The interior of bell jar 21 is then evacuated, e.g., by a conventional vacuum pump (not shown) connected to vacuum line 22 communicating through floor 20 with the interior of bell jar 21. After establishing a vacuum in the jar 21, and therefore in box 16, valve 23 in vacuum line 22 is closed and an activating gas is admitted through gas inlet 25 by opening valve 26. Because of the high vacuum, the gas permeates the granular mass in all parts of the box. Both irregular flow and irregular dilution are avoided, thus assuring uniform activation of the bond throughout the mold mass.

The gas used is one which reacts with the binder coatings to form a coherent bond.

A further feature of our invention is indicated in FIG. 2. A lid 30 for box 16 has a hole 31 in the central portion thereof to concentrate flow of the reactant gas entering and leaving the mass 17 of molding composition to an area on the back which is substantially spaced from edges and corners and also from pattern 15. If the drying and other factors discussed herein are at the optimum, this expedient is not necessary; but, by thus limiting the area in which wet spots may develop if conditions are not optimum, the risk of defective products can be substantially eliminated in a very practical way. A flexible sheet 32 of rubber or plastic or the like interposed over the mold material in the box 16 and having a plurality of small gas-entrance holes 33 may be used for distributing the reactive gas into the mass 17 with the desired flow pattern. Since this sheet is flexible, it acts as a diaphragm, being forced down by pressure of gas admitted to the chamber, thereby freeing all the holes and giving access to entering gas, even though the lid 30, which is often advantageous but not necessary, is used. A surprising advantage of such a diaphragm, whether or not these other functions are required, is that it is pulled up when the valve 23 is turned to vacuum and then, when the gas pressure is introduced through 25, the diaphragm slaps down onto the sand, re-compacting it if any loosening has been caused by the evacuation. This sheet may also serve as a gasket under lid 30, to prevent gas entering and dampening the material near the corners. Where trapping of gas or vapor occurs, there is advantage in providing a vent 36 through the pattern and at 38 through the bottom of the chamber so that it can be flushed out through the slight leak thus established. Gas can be pocketed and flushed out at any convenient point by the design of the hole arrangement in the diaphragm 32. The vent hole 36 is shown directly below an area in the diaphragm where the holes 33 are omitted, thereby making the point selected for the vent the last place to which the infusing gas penetrates.

The vent 36 may be sealed from the chamber by an O-ring seal 37 of a soft elastomer (e.g., "Korogel") so that the weight of the pattern and mold material effectively seals it. With more complex pattern shapes, more than one such vent may be used. In most cases, however, it is better to design the arrangement so that the interfering gas can be pocketed and vented at one place.

Another useful expedient is a permeable foam-rubber or foam-plastic diaphragm. It can be of any convenient thickness, though ¼" seems to work very well. It is thought that under pressure of the incoming gas, the material conforms better to the top surface of the sand than a smooth rubber diaphragm, thereby minimizing the interface effect, and giving better control over the pattern of the entering gas. This kind of diaphragm can be used without holes, or in conjunction with an overlying board containing holes, or may itself be sealed on one side with the exception of selected areas. It can also be sealed or covered in certain relatively small selected areas to control the pattern of infusion of the gas. One distinct advantage of this continuous permeable kind of diaphragm (containing no actual perforations) is that the pressure can be lowered in the chamber as rapidly as is desired without the danger of the dry sand being blown out of the flask by still unrelieved pressure inside the mass of sand. Also, it permits transfer of gas to or from the sand mass over the entire top area, so that it can be accomplished in the shortest possible time interval.

After the gassing step is complete and the desired bond formed, the flow of gas is stopped by closing valve 26; and the bell jar 21 is vented at 25a, after which box 16 is removed, opened, and the bonded mold 35 is released in a condition for use in the foundry casting operation.

The molding composition of the invention is characterized primarily by the fact that it is essentially dry, i.e., advantageously containing less than 0.1% by weight free water and no more than about 0.3%, with ordinary 50-mesh silica sand. If the sand is coarser, the amount of free water would be less to achieve equivalent desired pourability. With finer grain material, the amount of liquid that can be adsorbed without appreciable loss of the desired pouring freedom may be somewhat higher in view of the greater surface area of the finer particles over which such moisture is distributed.

Satisfactory results are achieved according to this invention using as the granular refractory a sand having as its major constituent dry silica sand. This is likely to be chosen particularly because of its low cost, although zircon sand and olivene sand are usable and have advantages already understood in the foundry art. The fineness of the grain size with this invention may satisfactorily be determined according to known foundry practice and skills. Generally, sands that have been washed and dried, and possess a fairly uniform particle size of the order of about 50 to 270 mesh produce highly satisfactory results. A given mold may be made entirely of one sand or it may have different kinds of sand in different parts thereof.

The essentially dry coated granules in these molding compositions, being free to move relative to one another, readily pack themselves to a substantially uniform density with a close-grained surface which accurately reproduces in detail and character the surface of the pattern. Satisfactory results have been achieved in the practice of this invention by vibrating or rapping the core box as the material is poured in, or after it is all in, resulting in substantially uniform density of about 85 to 105 pounds per cubic foot. Vibrating, rapping or shaking the box, especially in a direction transvers to gravity, assures sound molds. Vibrating, rapping, or shaking in a vertical direction is less effective to avoid arching and consequent voids in the material, but it does compact the granular material with corresponding increase of density. For maximum packing, vibrating or rapping is in both directions, e.g., in a circular or elliptical path.

The average density of coated silica sand of this invention is about 85–90 pounds per cubic foot. This can be increased to a maximum of 105–115 pounds per cubic foot if work is done on it, as by vibrating or jolting. For comparison, the so-called "riddled" density of damp sand conventionally screened onto a pattern would be only about 48 pounds per cubic foot, and the average density of the conventional green sand mold after all work has been done on it for compacting the sand by ramming, jolting, or squeezing, may be only 70 to 80 pounds per cubic foot with probable lack of uniformity from place to place in the mold.

It is possible with dry, pourable, granular materials to accomplish, selectively, different particle arrangements in the pattern surface and in the mold body, respectively. It has been pointed out that one of the advantages of a dry, pourable material is that the particles may be made to conform in a uniformly packed arrangement of maximum density along a pattern surface by subjecting the mass to a vibrating or shaking or jolting force. It is important that this be done if the smoothest surface is to be obtained, even with sand as fine as 100 mesh. If this is not done, the accidental, random arrangement of grains may not be sufficiently compact for every grain to become bonded to adjacent grains, with the result that some of the grains are lost from the mold surface, remaining on the pattern surface during the pattern removal step. Moreover, some of the random spaces between grains are large enough to cause surface roughness. If, however, such work is done on the sand, and a fine sand is used, the permeability of the sand is diminished to a point which may cause difficulty if it prevailed throughout the casting mold. We have found that with a dry pourable molding material, it is possible to combat this by adding a fibrous material, such as asbestos, the fibers of which are adapted to orient between the grains of sand along the forming surface. This, by the "sticks and stones" principle, prevents tight packing of the free grains within the mass, but does not interfere with the orderly dense arrangement of the spherical grains next to the smooth surface of the pattern. It is well known that the same thing is not accomplished by ramming sticky materials, because the ramming forces required to get the maximum surface denseness (smoothness) necessarily cause also compacting of the material (since it is used to transmit the compacting force) beneath the surface with consequent corresponding loss of permeability.

As an example of the above, we have been able to add 4% by weight of 7M grade (Philip Carey) asbestos to a Wedron C-30 sand, vibrate with a force which would otherwise compact it to a 100–105 lbs. per cu. ft. density and 20–25 AFA permeability, and instead achieve an 85–90 lbs. per cu. ft. density, a 40–45 AFA permeability, and a surface smoothness along the pattern face equivalent to that of the high density material. Aluminum cast on this sand, with and without the asbestos, respectively, had surfaces formed thereon which measured 125–150 micro inches in smoothness (profilometer measurement), neither being measurably smoother than the other.

The capacity of the individual grains for free movement permits a selective response in particle arrangement as between the smooth pattern surface and the interior of the mold body, where fibers or other suitable non-spherical materials are mixed with the aggregate. The conflicting requirements of the mold surface and of the mold body (the one calling for continuity of material, and the other calling for discontinuity, i.e., permeability) have been an ever-present problem to foundrymen; and thus, to be able easily and rapidly to meet these requirements by the selective behavior of a single material in response to a single compacting treatment or force, is more important and fundamental to the making of molds of outstanding quality than one would at first realize.

Another important advantage of a pourable composition is its slot-filling ability. In many molds, particularly for aluminum and magnesium casting, it is very important that numerous "chills" 18 (FIGURE 3) be set on the pattern, often so close together, to become incorporated in the mold as to extract heat from the casting as desired during the solidification step. It is very tedious to "tuck" damp and sticky mold materials in between and around these chills, and there is a limit to the number that can be held because of strength limitations of the mold materials. Because of these problems, the free use of chills has tended to be confined previously to compositions molded as slurries. The advantages of our invention make practical, to a degree heretofore unachieved, the incorporation of complex chilling in a granular refractory mold composition.

Mold compositions according to this invention are advantageous for use with flexible patterns, because very little or no external force is used to pack the mold material on the pattern surface and, therefore, the flexible pattern is not distorted by the molding, in contrast to the use of ordinary green sand where ramming or tamping is used to compact the sand.

The free pourability of molding compositions according to this invention also minimizes pattern wear, which conventionally is incurred by throwing, blowing or ramming the molding compositions against the pattern, processes which are unnecessary with the pourable dry material described here.

Bonding materials which give most satisfactory results in this invention for coating grains of the molding material to form an initially free-flowing pourable molding composition are those which can be applied as a liquid and extended to coat every grain and then solidified to a separate dry coat on each grain of sand or the like (e.g., by continued stirring in a drying atmosphere, or by drying while the grains are individually suspended in an upward flow of a drying atmosphere); and which, after drying, can be activated and set to a strong bond by a reactant gas. We have found that a single coating material may serve both as the potential binder material and as the material which reacts with the gas to activate the binder. Thus, various alkali metal silicates can be rendered adhesive, and then be set for bonding, by action thereon of carbon dioxide gas. The release thereby of bound water of hydration from that part of the coating where it is exposed to the gas makes the silicate coat adhesive. Probably some of the water thus released migrates to the adjacent remaining silicate, if any, not directly exposed to the gas and thus bonds the grains.

The silicate, as coated onto the granules of the mold material is sufficiently dry to be pourable and free flowing. Such silicate materials may be represented by the general formula $xM_2O.ySiO_2.zH_2O$ in which M is an alkali metal, advantageously sodium, and the ratio $x/y$ is advantageously that of the meta, ortho, and sesqui silicates (i.e., sodium metasilicate ($Na_2O.SiO_2.zH_2O$ where $z$ may indicate 5, 6, 8 or 9), sodium sesquisilicate

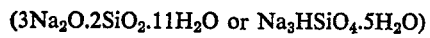

sodium orthosilicate ($2Na_2O.SiO_2.H_2O$), etc.), and mixtures thereof.

The sodium silicates of $Na_2O/SiO_2$ ratio (the $x/y$ ratio in the general formula above) between 2/1 and 1/1.2 are most advantageous for use in this way, as they are effective, activatable binders, are inexpensive, are readily coated onto sand, can be baked after bonding to drive off water and gases, if necessary, and, although strong binders when needed, are sufficiently weakened by the heat of metal casting so that the mold material can be removed from the casting. Other silicates can be used as binders if another means of activating them is used, e.g., including in the coating some other hydrated compound which releases water when gassed. For this purpose, one may use barium hydroxide octahydrate, or borax, or hydrated crystalline silicates. In general the binder coating should have bound water in the range of 10% to 75% by weight of the binder to be activated.

The gas activation of the binder may be by catalysis of a reaction, e.g., further polymerization, e.g., the action of HCl gas in bonding or setting up phenol-formaldehyde intermediate resin, or anhydro formaldehyde resins (especially condensation products of formaldehyde with aniline or toluidine).

Other materials have been found to be capable of activation by reaction with a dry gas on a dry coating to provide an effective bond for coated sand. Materials which are not ordinarily thought of as adhesives but which carry bound water releasable by gassing, may cement together contacting coatings when so gassed, e.g., sodium aluminate or barium hydroxide monohydrate.

Similarly, salt bonds may be formed without presence of water by a gassing reaction, e.g., ferric chloride ($FeCl_2$) gassed with ammonia gas (nickel chloride and cobalt chloride can be used also, but are inferior and more costly), sodium acid phosphate ($Na_2HPO_4.12H_2O$) gassed with ammonia gas (the potassium acid phosphate ($K_2HPO_4.4H_2O$) is inferior, as is also the calcium compound ($Ca(H_2PO_4)_2.H_2O$)), boric acid gassed with ammonia, etc.

The process of bonding a pourable granular mass by activating a potential binder carried by it, with a gas which is made to permeate the mass, and especially by chemical reaction of the gas with a solid carried in the mass, is to be distinguished from the process of the prior application of Xarifa Bean, Serial No. 651,933, filed April 10, 1957, with priority from December 4, 1950, wherein a coating of thermosetting resin is activated by heat or by solvent action. The present process embodies and utilizes the great advantages of that invention over previous processes, but in addition avoids the use of costly binders, heat resistant or wastable patterns and the relatively long processing time with the mold material on the pattern. The present process permits the use of inexpensive binders and gives almost perfect conformance of the mold material to the pattern and very quick setting of the material to sufficient strength for removal, so that the pattern is promptly available for reuse and costs are thus reduced.

Of these various alternatives, the coating of the grains of mold material with sodium silicate of the ratios set forth above and gassing with pure $CO_2$ is so surprisingly advantageous that it is recommended for most foundry molds.

These bonding techniques may be used also for bonding fibrous materials as such, or in admixture with sand, etc.

Although satisfactory results may be obtained with the various aforementioned materials, such results vary somewhat among the various materials and depending upon the particular operating conditions and molding techniques being utilized.

For example, it has been found that silicates at the metasilicate ratio are the least hydroscopic and that sand coated therewith will remain dry and free-flowing under ordinary dry storage conditions for prolonged periods after preparation and before use. On the other hand, gassed to full strength, the molds tend to deteriorate if not used the same day; whereas, if gassed to a lower strength (e.g., 4–8 p.s.i.), they harden to full strength (e.g. 30 p.s.i. or higher), on standing and drying. It is also noted that there is some tendency for shrinkage of the molded mass of sand during bonding when the metasilicates are used. If the gassing with $CO_2$ is done below about 68° F., the shrinkage is minimized.

Silicates of the orthosilicate ratio, on the other hand, while exhibiting substantially no undesirable volume change in the mold during bonding, and maintaining well the bond strength, are relatively more hydroscopic, ordinarily requiring special precautions to protect the coated grains from atmospheric moisture if they are to remain pourable.

Silicates at the sesquisilicate ratio are substantially less hydroscopic than those at the orthosilicate ratio and exhibit substantially no undesirable volume change during bonding. Molds made with the sesquisilicate binder keep their strength (e.g., 35–85 p.s.i) well under storage conditions.

The relative merits (on a descending qualitative scale, A, B, C, D, with A best and D poorest) of sands coated, respectively, with these three types of sodium silicates, are shown graphically by the table:

| Quality | Meta | Sesqui | Ortho |
|---|---|---|---|
| Ease of solution | A | A | D |
| Maintained dryness (non-hygroscopic) | A | A– | D |
| Initial airset strength | D | A | A |
| Final bond strength | C | A | A |
| Accuracy of surface reproduction | C | A | A |
| Alkalinity | A | B | C |

The shrinkage with the metasilicate binder, noted above, can be controlled by mixing metasilicate with a lesser amount of orthosilicate, e.g., in proportion 1% ortho to 1½–3% meta; or by chilling the sand to the neighborhood of 15° C., but advantageously without freezing. Such chilling, like the use of cooler gas, also reduces the loss of water, which should be taken into account in determining the amount of water added originally and the limit of drying. A final mixing or aeration (e.g., for 2 to 10 minutes) after storage of the coated sand and just before pouring it over the pattern, may be used to give improved strength by driving off water picked up during storage.

A surprisingly advantageous material, according to this invention, is a mixture of sodium sesquisilicate and sodium orthosilicate in a ratio of approximately 3 to 1. This mixture is less sensitive than the silicate of the sesqui ratio to variation in degree of drying after coating. It can be gassed at somewhat lower pressures (0–20 p.s.i.g., as compared to 20–40 p.s.i.g.) and the molds made of this mixture suffer less loss of strength on drying off free water after bonding (e.g., 25–50%, as compared to 40–70%). "P.s.i.g." is used herein as abbreviation for "pounds per square inch gauge pressure."

Molding composition, according to this invention and utilizing such mixed alkali metal silicate materials as the binder, can be prepared by intimately mixing the dry sand or other granular mold material with the silicate in dry powder or fine granular form in mixing apparatus such as the muller 12. Prepared in this way, the actual composition of the silicate binder material on the sand grains is essentially that of the crystalline silicate starting material. To the extent that the powdered binder can be kept uniformly distributed so that it will be engaged in the bight between adjacent grains where it will bond them when activated, such a mixture is useful in our invention but, in practice, better results are assured by precoating the grains. Heat and pressure exerted during mixing may fuse the silicate enough to form a coat on each grain, which dries during mixing. Generally, more advantageous results are achieved by adding to the granular material in a muller or other mixer, a pre-formed solution of the silicate as concentrated as feasible.

Such solution should be as concentrated as is permissible under other considerations, in order to avoid unnecessary evaporation, but the amount of water should be at least equal to the desired hydrate—in general, the highest hydrate of the compound. Thus, with metasilicate, the strength of the bond increases with increasing amount of water in the mixture up to that in the nonahydrate; but, beyond that, the bond may be weaker if more water is used in the mix.

When sodium orthosilicate is used, it may be added as a fine powder dispersed in water, because of the difficulty of dissolving the orthosilicate. Or the silicate powder may be mixed with the sand and then a solution of meta silicate added as needed to make a smooth adhesive coat on the grains.

Although we refer to "metasilicates," "orthosilicates," "sesquisilicates," etc., and to mixtures of them, actually they are decomposed by water so that they are usually regarded as "systems" or "complexes" which are designated most accurately as ratios of the alkali metal oxide to silica and water. The addition of alkali to the solution or the mixture of different silicate materials can result in different silicate complexes. Thus, specific references to particular silicate salts should be understood as referring to the metal oxide: $SiO_2$ ratio of the materials added to the mixer for coating the sand. Thus, for example, the 3:1 mixture of sesqui and ortho silicates referred to above (or other desired silicate:alkali metal ratio) can, of course, be obtained by admixing in solution a silicate with relatively low metal:silicate ratio (ratios as low as 1:3.75 have been used), and then adding an amount of alkali metal hydroxide or equivalent, to give the desired ratio in the solution.

Other things being equal, it is best to dry the coated sand as rapidly as possible, as deterioration of the final product may result from too long mixing. The reason for this is not known, but it may be that the mechanical working causes a change to a form which does not hold combined water so well.

Elevated temperatures (e.g., 50–95° C.) may be employed to hasten the evaporation of free water from the sand while mixing. With too slow drying, with cool or moist air, the bond strength attainable will drop before the coat is dry. It has been found satisfactory to carry out the mixing or mulling step at ordinary atmospheric temperatures for a time sufficient to dry the coated sand. If the silicate coat is to serve as a water carrier, the drying should not be such as to remove the bound water. We, therefore, keep the drying temperature below 80° C., so far as is possible.

Notwithstanding that such materials are ultimately bonded by exposure to carbon dioxide gas, it has not been found necessary to exclude air containing normal carbon dioxide content (0.03% by volume). The activating gas requires substantially higher concentration of $CO_2$, at least 1 cm. partial pressure, or a substantially longer reaction time; and since reaction of $CO_2$ from a gas mixture would leave an unreacted residue gas, special precautions are needed in such case to get uniform exposure to $CO_2$ and to prevent pocketing of the residue gas where it would block the needed flow of $CO_2$. Pure $CO_2$ gas is best for this process. (Gas pressures expressed in cm. or mm. designate absolute barometric pressures, i.e., the mercury column which can be supported in a barometer by the gas pressure designated.)

The passage of carbon dioxide gas into the mass of mold material 17 compacted on the pattern 15 renders the coatings on the grains adhesive and then firmly sets them to bond the grains into a cohesive mold. Although the molding composition appears to be essentially free of moisture when poured over the pattern, nevertheless the treatment with carbon dioxide converts the silicate coatings to an adhesive condition and promotes setting by further reaction with carbon dioxide.

Experience has shown that some combined water of hydration is desirable for forming a strong bond among the grains. For example, when the relationship between water released from a series of samples of coated sand, when heated to constant weight, and tensile strength of test blocks made by reacting with $CO_2$ corresponding samples of the coated sand, is plotted, the curve passes a maximum strength, with decrease in strength, if the water content is increased or decreased.

If there is a total content (including both free moisture and chemically combined water of hydration) more than slightly above that which can be chemically retained as water of hydration (e.g., more than 0.3% free water based on the total solids, i.e., weight of sand plus binder), the molding composition is not sufficiently dry to be easily pourable and free-flowing. On the other hand, if the chemically combined water content drops below approximately 25% of the total weight of solid silicate only, the tensile strengths of the bonded mold after treatment with carbon dioxide may be unsatisfactorily low, e.g., down to 5 pounds per square inch of cross section ("p.s.i."). To avoid overdrying during gassing, one may bubble the gas through water before it goes to the coated sand.

Drying of the coated sand should ordinarily be controlled to eliminate almost all of the free moisture, but may terminate while there is still some free moisture, advantageously a very small amount, e.g., 0.1%, in addition to water of hydration. Substantial variation in drying is permissible, even beyond the point where chemically bound water of hydration begins to be removed. Even in an open muller at ambient room temperature, continued excessive mixing in the presence of dry air and/or dry nitrogen may remove too much of the combined water from the silicate coating so as to reduce the bond strength obtained. We have found that mixing dry silicate with the sand at a temperature such that its water of hydration is released to liquefy the coating, leaves the material already below its maximum strength point on the curve above mentioned. As a practical matter, we have found that the correct drying can be determined by the appearance of a low smooth wave pushed up ahead of the plow in the muller; drying should be terminated when this smooths down almost to a minimum.

A 100-pound batch of 100-mesh silica sand was mixed in a muller with a solution containing 8 pounds of sodium sesquisilicate ("Metso 99" marketed by the Philadelphia Quartz Company) in 1.5 pounds of water, and the mixture was dried by flowing a stream of hot air (in the range 270° to 300° F.) into the muller while mixing. Samples were taken at intervals during the drying and made into conventional "dumbbell" blocks, which were gassed with $CO_2$, and then tested for tensile strength. High strength was obtained from the dry and free-flowing molding composition when the water content thereof (based on soldium silicate solids only) was below about 60% and above about 50%. The bond strength attained with material dried to 61% water was approximately 29 p.s.i. With decrease of water content, the tensile strength progresively increased to about 58 p.s.i. at about 54%. These water percentages are almost entirely bound water. Thereafter, with additional hot air drying, the tensile strength obtainable dropped rapidly until, with a moisture content of 50%, under the particular conditions of this test, the bond was too poor to be considered useful for a casting mold.

Thus, the type of bond obtained with the silicates depends on the extent of reaction with $CO_2$ which comes in contact with the binder. This is a function of both pressure and time. With a small amount of reaction, water is released from the compounds, and a wet bond of low strength is obtained (1 or 2 p.s.i.). Further reaction causes the bond to become plastic. It is stronger, and still has some give (3–10 p.s.i.). With still further reaction, the bond becomes increasingly stronger and more brittle (10–75 p.s.i.). When fully reacted, the bond is completely rigid. Thus, the kind of bond obtained can be controlled by the gassing technique. High strength is frequently desirable, but in some cases the brittleness of the strong bond creates problems in the pattern removal step, and a lower strength, more plastic bond, may be preferable.

These percentage figures for maximum strength vary somewhat according to the composition, the amount of water in the solution before drying, and conditions of drying.

Again, for example, it has been found that, for silica sand coated with approximately 8% by weight of sodium sesquisilicate, the maximum in the moisture-versus-strength curve occurs within the range 36% to 55% bound water, based on weight of the soluble silicate solids.

A similar batch of silicate material in the same concentration, on silica sand, but with different drying, mixing and gassing conditions, showed a dry and free-flowing condition at 45% bound water content and gave a bond strength of 32 p.s.i., which strength rose appreciably to 44 p.s.i. at 42% bound water, but dropped, although much more slowly, continuously as the bound water content was reduced below 40%.

It was found that the desirable dry and pourable condition of the molding composition was obtained with another batch when the chemically held moisture content (based on sodium sesquisilicate solids) reached 54%, and that the bond strength obtainable with the material at this stage of drying was approximately 29 p.s.i.; while tensile strengths progressively increased to about 58 p.s.i. as the moisture content was reduced to about 47%. Thereafter, with additional hot air drying, the tensile strength obtainable dropped rapidly to as low as 2 p.s.i. when the moisture content was further reduced to 43%.

Also, it has been observed that the size of the mass being bonded affects the strength obtained. Materials containing too small an amount of combined moisture to make possible the bonding of a small briquette will bond in, for example, a paper drinking cup. It is thought that water freed in the first part of the sample to react serves in the balance of the material to bring it up to a higher strength. However, there is a point below which there is too little water for even a large mass of the material to react and bond, although this level is considerably lower than the limits stated above.

With substantially pure $CO_2$, the bonding reaction is very fast, but can be slowed by dilution of the $CO_2$. It has been noted that substantial temperature rise occurs with such molding compositions during the gassing step, apparently due to an exothermic reaction. This can serve as an indication of the appropriate gassing time and also, by sampling during drying can serve to determine the point for terminating the drying. The amount and rate of such temperature rise appears to be independent of the size of the mold being made, but occurs most rapidly if the drying of the coated granular material has been arrested substantially at the dry and free-flowing stage, as described herein, the rate of temperature rise being decreased if drying of the molding composition is carried beyond such point. Therefore, by gassing successive samples during drying and noting the rate of temperature rise, the drying can be stopped when that rate shows a specified decrease from a maximum.

An easier, more practical, control for production foundry use is to record the power required by, i.e., the resistance to passage through the sand of, the muller. When it has returned to substantially what it was before addition of the silicate solution, the sand may be considered to be as dry as it was before adding said solution.

Comparisons among (1) various drying times in the coating of the molding composition, (2) time required in the gassing step to reach a maximum temperature, (3) the maximum temperatures reached, and (4) the tensile strengths of the bonded molds, indicates that a good bond is usually associated with a rapid temperature rise of approximately 100° F. or more during the first few minutes of the gassing reaction. If the initial temperature rise is substantially less than this, the resulting bond may not be strong enough. The best bond is not necessarily accompanied by the highest temperature or fastest rise but generally speaking, satisfactory results are obtained with such silicate bonding materials gassed with carbon dioxide when a sharp temperature rise of approximately 100° F. occurs during the first one to two minutes of gassing (i.e., after the end of the vacuum cycle and inlet of carbon dioxide gas in an arrangement as noted in FIGURE 1), with gassing being continued until a maximum temperature peak is reached and a leveling off of temperature is observed (usually at about 200° F. for most materials) within about two to three minutes of gassing time.

If the heat of reaction proves objectionable in any case, this can be controlled by using less alkaline silicates, which have lower heat of reaction, or by chilling the sand or gas to absorb some of the heat without raising the material to too high a temperature.

Such variables as heat of reaction, temperature rise, rate of reaction and the amounts of free and bound water in the coating all will influence the time and temperature of gassing. For use of our invention in ordinary foundry practice, it is not necessary to get the highest possible tensile strength, but only enough for usual foundry handling. Tensile strengths in the bonded mold from 10 to 15 p.s.i. are satisfactory for some purposes, but strengths up to 65 p.s.i. and above are quite feasible with this invention.

An important advantage attainable by this invention is that the granular material poured onto the pattern and shaken down does not slump when bonded as the binder film does not flow out from between the grains.

The gassing of molding compositions according to this invention can be by any of a variety of procedures. Thus, the reactant gas may be made to impregnate the mold material on the pattern surface by diffusion or flow and the duration of treatment can be reduced by using the reactant gas under super-atmospheric pressure; gas may be supplied through tubes inserted into the mold body or through the pattern, etc.

If the pressure of the gassing treatment is too low, the bond strength will suffer. The minimum feasible pressures are different for different silicates. 40 p.s.i.g. after a 5 mm. vacuum is a generally satisfactory gassing pressure. 20 p.s.i.g. is the minimum pressure for practical operation with sodium metasilicate or sesquisilicate, but good results can be attained as low as 0–10 p.s.i.g. if other factors are optimum. With a mixture 25% ortho and 75% sesqui, 10 p.s.i.g. is a satisfactory working pressure.

If the gassing of silicate binders results in liberation of so much water or other liquid that objectionable sogginess or inadequate bonding results, or if all of the air is not removed in the vaccuum step, the arrangement of FIGURE 2 may be adopted. Thus, with substantially the entire flow of gas into the mold mass being directed through a centrally located portion at the back of the mold, e.g., through the central hole 31 in lid 30 and the small perforations 33 in diaphragm 32, any such excess moistening due to liberation of water from the binder at points of particularly high $CO_2$ concentration does not interfere with rapid development of a strong bond at the corners of the mold or at the mold surface adjacent the pattern, where strength is required during removal from the pattern. Advantageously, any such excessively moist areas of the mold are located by entrance holes, so as to be well supported by adjacent bonded areas. Improvement in the bond strength in such areas can be accomplished by a second short gassing step after drying of the moist areas. This is most effective, if, after a short gassing treatment at a low pressure (e.g., not more than about 10 p.s.i.g. above atmospheric), the pressure is dropped to a few millimeters (absolute) by a vacuum pump and then $CO_2$ gas is admitted up to pressure in the range 1–10 atmospheres. The final strength in areas where excess moisture was deposited may be several times that after the first gassing. When the treatment with $CO_2$ is at pressures below 1 atmosphere, other things being equal, poor strength molds will result.

Other activating gases may be used which catalyze a bonding reaction or decompose some ingredient of the binder to give a decomposition product which will activate the binder. Thus, HCl gas may act in either of these ways depending upon the binder used, $SO_2$ and other acid anhydride gases act to decompose hydrated salts in the same way as $CO_2$; but, as a practical matter, $CO_2$ is better than the others. Ammonia gas reacts to activate a binder comprising oxalic acid, $(COOH)_2 \cdot 2H_2O$, or boric acid, $H_3BO_3$, or calcium phosphate, $Ca(H_2PO_4)_2 2H_2O$, or sodium phosphate, $NaH_2PO_4 \cdot H_2O$, or ferric chloride, $FeCl_3$, or nickel chloride, $NiCl_2$.

The bond produced by $CO_2$ gassing of silicate coated sands, as herein described, holds up well if the resulting molds are baked to drive off gases and vaporizable material. Thus, we have found, for example, that such a bonded mold, after baking for one hour at 250° F., lost only one-quarter of its strength.

Molding compositions embodying, or for use in, this invention may include material other than the granular refractory and the bonding material coating thereon. For example, with silicate binder materials, it may be desired to add a small amount (e.g., ¼–1% by weight of the mass) of dextrin, corn flour, or a urea material during the coating operation, to minimize or control the shrinking effect noted above as characterizing the use of sodium metasilicate. Similarly, blown mica or fibrous materials, e.g., asbestos, glass fiber, slag wool, etc., or other lightweight particles, may be added to the sand for decreasing the mold density or weight or thermal conductivity. Such fibrous material may also tend to reduce the excessively moist areas of the mold above referred to during the gassing step by providing a wicking action to aid in the dissemination of liquid. 2% of asbestos in the mold composition will improve permeability and decrease density. A similar amount of cotton or bast fiber or glass fiber can also be used. Most clays and, in general, dusts such as plaster dust should be avoided or kept in very small amount; however, certain kinds of clays, e.g., Georgia kaolin, may be beneficial.

It has been pointed out that some free water is released as a result of the bonding reaction. In some cases, it may be as high as 2½ to 3% by weight of the mold. In instances where this is too high a volatile content for the shape of the casting and the permeability of the sand, and it is not convenient to accommodate it by venting, all or part of it may be removed by drying at any temperature between room temperature and conventional core drying temperatures. Considerations of times, residual bond strength, and effects of thermal stresses on the mold will affect the temperature selected. In most cases, temperatures in the range of 150–250° F. will be found preferable. Radiant heat, infrared, or dielectric baking may be used, according to known practices.

The relative proportions of refractory granular material in the molding compositions may be varied substantially, just as with any other bonded mold material.

The operating and preferred ranges of proportions of binder material to refractory granular material in molding compositions embodying, or for practicing, this invention are generally of the order of the proportions suggested in the illustrative examples disclosed below. Satisfactory results are achieved according to this invention by incorporating approximately 6% to 10% by weight of silicate based on the dry weight of the hydrated silicate and the final dry weight of the coated molding composition. With some applications (notably solid cores or briquette molds, as compared with molds having intricate cavities with thin section projections thereinto), satisfactory results are obtained with as little as 3% or 4% of the silicate binder material on the molding composition.

As already well understood in the art of bonded sand molds, it is desirable to use a mold release agent on the pattern surface. For this, we have found very satisfactory a colloidal graphite film. This type of film is especially advantageous with patterns, such as aluminum, which would otherwise be attacked by the alkali of the binder.

*Example I*

A batch of 200 parts by weight of 100-mesh silica sand (C–30 Wedron) was poured into a hooded muller. The material was distributed evenly through the muller and a hot solution (140° F.) of 16 pounds of sodium sesquisilicate (Metso 99) in 3.1 parts by weight of water was poured into the sand while it was kept stirred in the muller. Mulling was continued for 3 minutes to mix the sand and the solution. Hot air at 290°–300° F. was then passed continuously over the sand to dry it so as to remove all the free water. This required approximately 25 minutes. The sand was first wet, then became mealy. Then, as it became drier, showed a surface ripple where it falls from the plows of the muller. When this ripple subsided until it became only slightly evident, the dry, free-flowing material was dumped into a tight container and allowed to cool to room temperature. At this point, approximately 20 pounds of it were poured over an intricate aluminum pattern, the surface of which had been dusted with a fine mica flake mold release (Lubikold) and the pattern and sand were subjected to vibration until the sand was compact. The pattern containing the coated sand was then placed in a closed chamber where the pressure was reduced to 3–5 mm. of mercury (absolute). Gaseous $CO_2$ was then admitted, raising the pressure to 40 p.s.i.g. for 2 minutes, during which time the temperature of the sand mass rose spontaneously to approximately 190° F. At the end of 2 minutes, the $CO_2$ was vented, reducing the pressure to atmospheric, and the pattern containing the then integrally bonded mold was removed, and had a tensile (cohesive) strength in excess of 20 p.s.i. After the mold was removed from the pattern, a mating mold component was made in a similar fashion, and the two parts were assembled to make a mold cavity into which a molten aluminum alloy was poured at 720° C. After the casting had cooled, the mold was broken away from the casting and adhering sand was washed off with water. The resulting casting was of excellent commercial quality.

*Example II*

A batch of 1000 parts by weight of 100-mesh silica sand heated to 180° F. was mixed with a solution of 100 parts by weight of sodium metasilicate pentahydrate (Philadelphia Quartz Company's "Metsogranular") in 40 parts of water. It was mixed in a conventional blade-type blender (e.g., a "Hobart" mixer) and dried during mixer agitation with a stream of dry air until it became dry and pourable. The sand thus coated was poured over a small pattern equipped with vents to allow penetration of gas at the pattern face. $CO_2$ was allowed to flow into and through the sand mass at a moderate flow pressure for 3¼ minutes. The sand grains became bonded at their points of contact. The mold element thus obtained was easily removed from the pattern and was satisfactory for commercial use in a foundry.

*Example III*

A batch of 2000 parts by weight of 50-mesh silica sand was coated with a solution of 200 parts by weight of sodium orthosilicate (Philadelphia Quartz Company's Metso 200) in 68 parts by weight of water. An 18" muller was used to mix the solution with the sand, and while mixing was continued the sand was dried with a stream of dry nitrogen until it was dry and free-flowing and showed a low smooth wave in the sand ahead of the plow in the muller. It was then run into moisture-tight containers closed with tight-fitting lids. Several cores were made from this mix by pouring the sand into a core box and flowing $CO_2$ gas through the sand in the core box. Gassing time was approximately 2 minutes, with dry $CO_2$ supplied at room temperature. Pressure in the first minute was between 1 and 2 p.s.i.g. and for the second minute was between 5 and 10 p.s.i.g. The resulting cores were strongly bonded, and had good, non-friable surfaces. One of these cores was set in a conventional green sand mold and covered with molten #43 aluminum alloy poured at 680° C. A sound casting of good commercial metallurgical quality was obtained with no difficulty. The core was easily disintegrated and removed from the casting by washing it out with water.

*Example IV*

A batch of 1000 parts by weight of 120-mesh Wedron silica sand was mixed in a blade-type ("Hobart") mixer with a solution of 100 parts by weight of sodium sesquisilicate (Philadelphia Quartz Company's "Metso 99") in 20 parts by weight of water. Both the water and the solution were used at room temperature. The sand was then dried with dry nitrogen while being continually stirred by the mixer. When the mass was dry, it was sieved through a 40-mesh screen to remove any lumps. A core for an automobile torque converter rotor was made from this mix by pouring the coated sand into an epoxy resin core box, with an electric vibrator attached to the core box to pack the sand, and flowing $CO_2$ gas under a pressure of between 5 and 10 p.s.i.g. through the sand from one end of the core box to the other for approximately 4 minutes. A well bonded and commercially satisfactory core was obtained.

*Example V*

A solution was made of 50 parts by weight of sodium metasilicate and 50 parts of sodium orthosilicate in 65 parts of water, and was added to 3,630 parts of zircon sand which had previously been heated to 180° F. The sand was mixed in a muller and dried with cold, dry nitrogen until it was fairly dry to the touch. It was then transferred to a "Hobart" blade-type mixer and dried with agitation until it was free-flowing. Cores were made with this material by pouring it into a core box, vibrating to obtain tight packing, and forcing $CO_2$ through it under pressure for 1½ minutes. These cores were well bonded, and very easily removed from the core box, and of a quality satisfactory for commercial foundry use.

*Example VI*

A batch of 45,400 parts by weight of 100-mesh silica sand (Wedron C–30) was poured into a hooded muller. The material was distributed evenly through the muller, and a hot (160° F.) solution of 2724 parts of sodium sesquisilicate (Metso 99) and 616 parts of sodium orthosilicate (Metso 200) in 948 parts of water were poured into the sand. Meanwhile, the mulling was continued for 3 minutes thoroughly mixing the sand and the solution. Hot air at 290° F.–300° F. was then passed continuously over the sand until all of the free water was removed and the ripple at the plows had almost disappeared, as in the previous example. The dry, free-flowing material was dumped into a closed container and allowed to cool to room temperature. At this point, molds were made as in the previous example, except that the gassing pressure used was 10 p.s.i.g. The molds were assembled and a casting poured, as in the previous example. The molds were satisfactory in every respect and the castings made therewith were of excellent quality.

*Example VII*

As an example of the use of other binder materials set by other gases, 25% by weight of anhydro formaldehyde aniline in saturated toluene solution is coated on Ottawa 50-mesh sand by mixing in a conventional blade-type ("Hobart") mixer, with evaporation of the solvent during mixing until the coated sand was dry and freely pourable. Cores were made by pouring the coated sand freely into a core box, but in this case gassing was accomplished with hydrogen chloride gas for approximately ten minutes. A rigid, strong bond was obtained after gassing. Four such cores were made in this manner and were promptly removed from the core box and subsequently used to make aluminum castings in conjunction with conventional green sand mold parts. In this example, one of the four resin-bonded cores was allowed to stand 24 hours in the atmosphere, one was baked at 450° F. for one-half hour, one was baked at 450° F. for one hour, and the fourth was used for casting immediately upon removal just after gassing. Aluminum alloy poured on each of these cores gave castings which were accurate reproductions of the surface and dimensions of the cores as formed.

*Example VIII*

Coated sand prepared as in Example I was stored in a sealed chamber for 24 hours and then remixed for 5 minutes in the muller. This coated sand was then poured on a pattern as in Example I and put into a closed chamber where it was first subjected to a vacuum of 40 mm. absolute pressure, then $CO_2$ was admitted to bring the pressure to 50 p.s.i. and held at that pressure for two minutes; then evacuated to 60 mm. absolute pressure and then a second gassing with $CO_2$ at 50 p.s.i.g. for two minutes, after which the chamber was vented and the mold removed from the chamber and from the pattern.

Although we have referred in the above examples to making aluminum castings, the invention has advantage in casting of other metals. Thus, these molds are good for casting of magnesium with accuracies hitherto unattainable. The well-known inhibitors required hitherto in sand casting of magnesium (e.g., fluoborates or fluosilicates) can be used by adding to the sand after coating, according to our invention. Sulfur may be used, but should be added just before use. Boric acid is not recommended because it can react with the silicate to release combined water.

*Example IX*

Three hundred pounds of Wedron C–30 sand were put in a Beardsley Piper No. 40 Speedmuller. To this was added a hot solution of 17½ pounds of Philadelphia Quartz B. W. liquid silicate (1:1.65 $Na_2O$ to $SiO_2$ ratio) and 7½ pounds of sodium hydroxide flake in 1395 milliliters of water. The solution was added with the muller running, and mulling was continued until the ammeter on the muller motor dropped back to the same reading as before the solution was added. (This indicates a return to a dry, free-flowing condition.) This took approximately 10 minutes. The sand was removed from the muller and allowed to cool. To a portion of this dry, coated sand was added 1% potassium fluoborate, to another portion was added 3% potassium fluoborate. A 90-pound mold was made of this material by pouring this sand over the pattern, the 1% fluoborate material being placed adjacent to the light sections of the pattern, and the 3% fluoborate material being placed adjacent to the heavy sections (gates, risers, etc.). The balance of the mold (portions not contacting molten metal) was made of sand containing no inhibitor. The pattern was then vibrated to pack the sand, and the sand and pattern were then placed in a chamber for gassing. A vacuum was pulled to 5 mm. absolute, and then $CO_2$ was introduced at 40 p.s.i.g. for two minutes. The $CO_2$ was reduced to atmospheric pressure, the chamber opened, and the mold stripped from the pattern. Cope and drag halves were made in this manner. They were placed in a 250° F. oven for four hours, assembled, and AZ91C magnesium alloy was poured into the mold cavity at 1500° F. The resulting casting met all commercial requirements for a precision cast.

Although evacuation before gassing is not essential to effective use of the invention and is not specifically mentioned in several of the above examples, it is desirable to include it in practical production procedures as it is difficult otherwise to assure adequate flow of the activating gas to all parts of the granular mass.

We claim:

1. The method of making metal casting molds and the like which comprises forming a loose granular mass of substantially zero green strength on a pattern surface by pouring onto said surface a dry granular refractory material, individual grains of which move readily over one another so as to form a talus slope when laterally unsupported, and which includes a dry, gas-activatable binder distributed among and between said grains, activating said binder to a strong bond by permeating with an activating gas the resulting granular mass while on said pattern surface, removing the resulting bonded granular body from the pattern surface, and reusing the pattern for repetition of the process.

2. In a method of forming a gas permeable bonded casting mold and a mold surface thereon accurately representing the surface of a pattern, the combination of steps comprising forming a dry mixture of granular refractory material with a water-activatable binder which, although dry so that individual grains can move freely on one another, contains bound water releasable by reaction with a gas, whereby to activate said binder, keeping the mixture dry so that it is pourable at the time of use, pouring the resulting dry granular mixture onto the surface of a pattern, permeating the granular mass thus formed, while on the pattern, with said activating gas whereby to release said bound water and thereby to activate the binder to bond adjacent grains in contact therewith, and removing from said pattern the resulting bonded mold when it is bonded into a coherent mold body, and repeating the process with the same pattern.

3. The method of making metal casting molds and the like which comprises coating the grains of a loose granular refractory material with a gas activatable bonding material which is dry under storage conditions, whereby the coated dry granular material is free-flowing and pourable, pouring said granular material onto a pattern surface, keeping said material dry and unactivated until formed on said pattern and while on said pattern permeating it with said activating gas, thereby sticking together adjacent grains at their points of contact and converting the loose granular mass into a coherent mold body, removing the mold body from the pattern and repeating the process with the same pattern.

4. The method of making metal casting molds and the like which comprises coating individual grains of a granular refractory material with a gas activatable potential binder forming a dry surface on said grains whereby the granular material has substantially no green strength, but the grains thereof move readily over one another so that the material readily forms a talus slope, when laterally unsupported, and the granular material is dry and pourable so as to conform to a pattern surface when poured thereon, said binder having, at least at the exposed surfaces of said coatings, a compound carrying chemically bound water of hydration, keeping said granular material dry until formed, forming it by pouring onto a pattern surface, permeating the resulting mass on the pattern with a reagent gas which reacts with said hydrated compound giving one which contains less bound water, thus releasing water into said coating on the surfaces of the grains and activating the binder, to bond the grains at their points of contact and converting the loose granular mass into a coherent mold body with surface corresponding to that of the pattern, removing the resulting mold body from the pattern and repeating the process with the same pattern.

5. In a method of forming a gas permeable bonded casting mold of the character described having a mold surface accurately representing the surface of a pattern against which said mold is formed, the combination of steps comprising admixing a granular refractory material and a hydrated silicate gas-activatable binder material to form an essentially free-flowing and pourable granular material the grains of which are individually coated with said binder material and which is substantially free of moisture but carries bound water of hydration in said binder, pouring the thus-coated granular material onto the surface of a pattern, subjecting said coated granular mass on said pattern to permeation with carbon dioxide gas effecting chemical reaction, liberating water of hydration and setting said binder films on said granules to form a cohesive bonded mass of increased strength and removing said bonded mass from said pattern in the form of the finished and bonded mold.

6. In a method of forming a gas permeable bonded casting mold and a mold surface thereon accurately representing the surface of a pattern against which said mold is formed, the combination of steps comprising admixing a granular refractory material with a water solution of an alkali metal silicate and drying to form an essentially dry, free-flowing pourable mass in which the grains are free to move on one another and the dry mixture contains enough bound water to render the silicate adhesive, pouring the resulting granular material onto the surface of a pattern, subjecting said granular mass on said pattern surface to inertial forces for compaction thereof, subjecting the granular mass thus formed on said pattern to contact with a gaseous reactant for releasing said water of hydration of the silicate and thereby to bond adjacent grains at spaced points of contact to form a coherent mold structure, and removing said pattern from said mold structure.

7. In a method of forming a gas permeable bonded casting mold of the character described having a mold surface accurately representing the surface of a pattern against which said mold is formed, the combination of steps comprising admixing a granular refractory material and a binder activatable to adhesiveness by an acid gas to form an essentially dry and pourable granular material the grains of which are free to move on one another and are individually coated with said binder, pouring the thus-coated granular material onto the surface of a pattern, subjecting said granular coated mass on said pattern to permeation with an acid reactant gas effecting chemical reaction and bonding of said binder film on said granules to form a cohesive bond in said mass, and removing said bonded mass from said pattern in the form of the finished and bonded mold.

8. The method defined in claim 1 in which the binder used is a crystalline sodium silicate with $Na_2O/SiO_2$ ratio between 2/1 and 1/1.2 and the activating gas is carbon dioxide.

9. The method defined in claim 1 in which the $Na_2O/SiO_2$ ratio of the binder used corresponds substantially to sodium sesquisilicate.

10. The method defined in claim 1 in which the $Na_2O/SiO_2$ ratio of the binder corresponds substantially to sodium meta silicate.

11. The method defined in claim 1 in which the $Na_2O/SiO_2$ ratio of the binder used corresponds substantially to sodium ortho silicate.

12. The method defined in claim 1 in which the binder used is a mixture of sodium sesquisilicate and sodium ortho silicate in a ratio within the range 1–8/1.

13. The method as defined in claim 8 in which the gas permeation of the granular material is continued until its coherent strength is substantially 20 pounds per square inch of cross section.

14. The method as defined in claim 10 in which ¼–1% of carbohydrate is added to the granular material to control shrinkage.

15. The method as defined in claim 8 in which the granular material when permeated by the carbon dioxide is chilled to about $-15°$ C. but above the freezing point of water in the silicate solution formed by reaction with the carbon dioxide.

16. The method as defined in claim 1 in which the binder used is an alkali metal silicate which holds bound water in its solid state, a solution of said binder is mixed with a granular refractory and the resulting mixture is dried while mixing to expose all surfaces to the drying and to crushing any agglomerates which may form.

17. The method as defined in claim 1 in which the binder used is an alkali metal silicate which holds bound water in its solid state, a granular refractory material is heated to the range 50–95° C., a solution of said binder is mixed with the granular refractory and the resulting mixture is dried while mixing to expose all surfaces to the drying and crushing any agglomerates which may form.

18. The method defined in claim 1 in which the binder used is an alkali metal silicate which holds bound water in its solid state, a solution of said binder is mixed with a granular refractory and the resulting mixture is dried while mixing to expose all surfaces to the drying and crushing agglomerates which may form and the resulting granular material is re-mixed for about 10 minutes just before forming on the pattern and gassing.

19. The method defined in claim 1 in which the binder used is a crystalline sodium silicate with $Na_2O/SiO_2$ ratio between 2/1 and 1/1.2 and the activating gas is carbon dioxide at a pressure in the range ⅓–100 atmospheres.

20. The method defined in claim 1 in which the binder used is sodium ortho silicate mixed in finely divided form with a granular refractory and held in a coating on individual granules by adding thereto and mixing therewith a solution of sodium meta silicate, and drying while mixing and crushing any aggregates.

21. The method as defined in claim 1 in which the permeation by the activating gas is effected by enclosing the pattern surface and the loose granular mass, substantially evacuating air from the enclosure, admitting the activating gas thereto until it has diffused to and reacted with the bonding material in all parts of the mass.

22. The method as defined in claim 5 in which the permeating by the $CO_2$ activating gas is effected by enclosing the pattern surface and the loose granular mass, substantially evacuating air from the enclosure, admitting the activating gas thereto until it attains a pressure of at least 10 p.s.i.g.

23. A dry pourable composition for forming foundry molds, containing less than about 0.3% by weight liquid, having no measurable green strength when formed on a pattern, and composed essentially of a granular refractory material and a hard, dry, crystalline alkali metal silicate coating adherent thereon containing bound water sufficient, when partially released, to activate such coating to an adhesive condition.

24. The molding composition as defined in claim 23 wherein the refractory material is silica sand.

25. The molding composition as defined in claim 23 wherein the refractory material is zircon sand.

26. The composition defined in claim 23 wherein the silicate is a hydrate of an adhesive-type sodium silicate at least as highly hydrated as the pentahydrate.

27. The method of making a dense molded body of bonded sand which comprises coating the sand with a dry hard coating of a bonding material dry and gas-activatable to an adhesive, pouring the coated sand onto a forming surface, thereafter vibrating said surface and through it the coated sand, and thereafter activating the coating to bond adjacent grains of sand by subjecting said dry bonding material to an activating gas.

28. The method as defined in claim 27 in which the vibration is transverse to gravity whereby to break any incipient arching.

29. The method as defined in claim 27 in which the vibration is toward and away from the forming surface whereby to pack the grains more tightly thereon.

30. The method as defined in claim 27 in which the vibration has components both toward and away from the forming surface for tighter packing and across the surface for breaking up incipient arching, and said surface is arranged mainly horizontally whereby the sand when poured thereon is initially packed by gravity and is aided in such packing by the vibrational forces.

31. The method as defined in claim 3 in which the coated granular material is stored after mixing and is re-mixed under drying conditions for a few minutes before pouring onto the pattern surface.

32. The method as defined in claim 31 in which the granular material during re-mixing is exposed to drying radiation from heat lamps.

33. The method of making molds and the like which comprises packing onto a permeable pattern a granular mold material having a dry gas-activatable bonding material distributed therethrough and between adjacent grains thereof, and forcing through the pattern and into the granular mass thereon an activating gas thereby activating the bonding material to bond together the grains of the mold material.

34. The method as defined in claim 2 in which the activatable binder is a water activatable acrylic resin and barium hydroxide octa hydrate is mixed therewith and the activating gas is $CO_2$.

References Cited in the file of this patent

UNITED STATES PATENTS

| | | |
|---|---|---|
| 2,807,556 | Stark | Sept. 24, 1957 |
| 2,824,345 | Zifferer | Feb. 25, 1958 |
| 2,835,602 | Benner | May 20, 1958 |
| 2,877,125 | Duplin | Mar. 10, 1959 |
| 2,913,787 | Cooper | Nov. 24, 1959 |
| 2,991,267 | Bean | July 4, 1961 |

FOREIGN PATENTS

| | | |
|---|---|---|
| 532,044 | Canada | Oct. 23, 1956 |
| 654,817 | Great Britain | June 27, 1951 |
| 710,099 | Great Britain | June 9, 1954 |
| 964,785 | France | Feb. 8, 1950 |
| 986,904 | France | Apr. 11, 1951 |
| 986,905 | France | Apr. 11, 1951 |
| 1,079,343 | France | May 19, 1954 |

OTHER REFERENCES

Schumacher: Amer. Foundryman, September 1954, pages 46–9.

Gotheridge et al.: Foundry, March 1956, pages 128–135.